United States Patent [19]

Ellis

[11] 4,424,328

[45] Jan. 3, 1984

[54] SILICONE-CONTAINING CONTACT LENS MATERIAL AND CONTACT LENSES MADE THEREOF

[75] Inventor: Edward J. Ellis, Georgetown, Mass.

[73] Assignee: Polymer Technology Corporation, Wilmington, Mass.

[21] Appl. No.: 327,279

[22] Filed: Dec. 4, 1981

[51] Int. Cl.³ .............................................. C08F 20/10
[52] U.S. Cl. ................................ 526/279; 351/160 R; 351/160 H
[58] Field of Search ..................... 526/279; 351/160 R, 351/160 H

[56] References Cited

U.S. PATENT DOCUMENTS

| 4,139,692 | 2/1979 | Tanaka et al. | 526/279 |
| 4,152,508 | 5/1979 | Ellis et al. | 526/279 |
| 4,182,822 | 1/1980 | Chang | 526/279 |
| 4,216,303 | 8/1980 | Novicky | 526/279 |
| 4,276,402 | 6/1981 | Chromecek et al. | 526/279 |

*Primary Examiner*—Harry Wong, Jr.
*Attorney, Agent, or Firm*—Wolf, Greenfield & Sacks

[57] ABSTRACT

According to the invention contact lenses are formed of unsaturated, multifunctional, organosiloxanes alone or mixed with monofunctional organosilanes and in some cases a hardening agent such as methyl methacrylate, hydrophilic monomer wetting agents, and itaconate hydrophilic and hardening agents. The multifunctional organosiloxane adds higher impact strength and reduces brittleness, probably due to greater cross-linking density in the final product and retains the desirable properties of silicone-containing materials for use in contact lenses.

33 Claims, No Drawings

SILICONE-CONTAINING CONTACT LENS MATERIAL AND CONTACT LENSES MADE THEREOF

BACKGROUND OF THE INVENTION

Soft contact lenses can be divided into two basic types, water absorptive and non-water absorptive. The water absorptive lenses, commonly referred to as "hydrogel lenses", are generally prepared from 2-hydroxyethyl methacrylate (HEMA) or copolymers with HEMA as the major component. High water content lenses have also been produced from vinylpyrrolidone. Non-water absorptive soft contact lenses are produced from silicone rubber or like materials. Such soft contact lenses can have one or more of the following disadvantages: poor durability, less visual acuity than hard lenses, poor oxygen permeability, and/or ease of bacterial contamination.

Hard contact lenses produced from polymethyl methacrylate (PMMA) have been known in the art for many years and offer the advantages of optical clarity, dimensional stability and durability. Although PMMA has been the standard of the hard contact lens industry, it has at least two drawbacks. Because PMMA is marginally hydrophilic a lens wearer may experience discomfort as a result of a foreign body reaction. Secondly, oxygen gas transport through PMMA contact lenses is extremely low which dictates that the lenses cannot be worn continuously for an extended period of time. Since the cornea receives its oxygen directly from the atmosphere the PMMA lens wearer often experiences corneal swelling and irritation due to prolonged oxygen deprivation.

Within the past ten years commerical cellulose acetate butyrate (CAB) has been utilized in an attempt to provide a hard contact lens that will transport oxygen. Although CAB exhibits modest oxygen permeability it lacks other essential qualities necessary for a contact lens material. The scratch or mar resistance of CAB contact lenses is poor which may be a reflection of the relative softness of CAB when compared to PMMA. Additionally, CAB lenses are often dimensionally unstable.

More recently, siloxane containing copolymers have been introduced as oxygen gas permeable hard contact lens materials. These polymeric compositions are generally prepared by copolymerizing methyl methacrylate with a siloxanyl alkyl ester of methacrylic acid. Contact lenses containing substantial amounts of organosiloxane groups tend to be hydrophobic. Attempts to impart hydrophilic properties to such systems include the incorporation of a wetting agent and treatment of the lens surfaces. Incorporation of a wetting agent can improve the wettability of the lens but may also render the lens translucent when used in excessive amounts. Contact lenses containing such wetting agents can be tolerated by the wearer but tend to accumulate proteinaceous matter from the tear fluid. This results in decreased transparency of the lens and wearer discomfort. Surface treatment of the lens affords a wettable surface but can lack permanence. Any scratches or adjustments made on such lenses exposes the hydrophobic bulk material. Repeated surface treatment is then necessary which can be inconvenient.

The contact lens field has long known the advantages of silicone polymers for use in contact lenses. Poly(dimethylsiloxane) polymers are transparent and highly permeable to oxygen, although use of these polymers in contact lenses can present difficulties in the fabrication and finishing of lenses because of the rubbery nature of the polymers. Contact lenses produced from poly(dimethylsiloxane) are often inherently hydrophobic and often must be surface treated to render the surfaces wettable by tears.

It's known that the use of a methacrylate monomer containing a silicone moiety can be copolymerized with the standard monomer utilized in conventional hard contact lenses, i.e., methyl methacrylate, to obtain a copolymer of varying hardness values depending upon the ratio of hard and soft monomers employed. Thus, some attempts have been made in the art to produce hard oxygen-permeable contact lenses. For example, U.S. Pat. No. 3,808,178 discloses a copolymer of methyl methacrylate with a siloxanyl alkyl ester of methacrylic acid. The use of special wetting agents and cross-linking agents are also taught in U.S. Pat. No. 3,808,178.

In U.S. Pat. No. 4,152,508 the use of an itaconate ester copolymerized with a siloxanyl alkyl ester of methacrylic acid is disclosed. The siloxanyl alkyl ester provides for high permeability and the itaconate ester gives increased rigidity, hardness and some degree of wettability. In addition, specific cross-linking agents and hydrophilic monomers are incorporated which provide dimensional stability and wettability to contact lenses generated therefrom.

The compositions disclosed in U.S. Pat. Nos. 4,216,303 and 4,242,483 are branched siloxanyl alkyl esters of methacrylic acid essentially as suggested by the prior patents.

U.S. Pat. Nos. 4,153,641 and 4,189,546 teach the use of monomeric polysiloxanes end capped with activated, unsaturated groups. By varying the type and amount of comonomer as well as the moiety both hard and soft polymeric compositions are said to be possible. $\alpha, \omega$Bis (4-methacryloxybutyl) polydimethylsiloxane is disclosed in which the poly(organosiloxane) moiety varies from about 0 to 800 units in length. For a hard contact lens the poly(organosiloxane) moiety should be of a rather short length, perhaps 0 to 10 units long, to avoid incompatibility in the final composition due to phase separation. Therefore, when comparing the monomeric polysiloxanes disclosed in both U.S. Pat. Nos. 4,153,641 and 4,189,546 with siloxanyl alkyl esters of methacrylic acid disclosed in U.S. Pat. Nos. 3,808,178 and 4,152,508, on the basis of utility in gas permeable hard contact lens compositions, similarities are noted. Whereas the siloxanyl alkyl esters of methacrylic acid disclosed in U.S. Pat. Nos. 3,808,178 and 4,152,508 are monomers, that is, contain one polymerizable unsaturated group, the monomeric polysiloxanes disclosed in U.S. Pat. Nos. 4,153,641 and 4,189,546 contain two such polymerizable unsaturated groups.

SUMMARY OF THE INVENTION

It is an important object of this invention to provide novel unsaturated, multifunctional organosiloxane materials useful in forming contact lenses alone or in combination with other organic materials.

Another object of this invention is to provide unsaturated, multifunctional organosiloxanes in the form of contact lenses which siloxanes can be used alone or in combination with other organic materials.

A further object of this invention is to provide unsaturated, multifunctional organosiloxanes for use in combination with monofunctional organosiloxanes with or without other organic materials to form novel and improved contact lenses.

An additional object of this invention is to provide contact lenses in accordance with this invention which are oxygen-permeable, dimensionally stable, hydrophilic and of good optical transparency.

Still another object of this invention is to provide contact lenses in accordance with the preceding objects wherein outstanding hard oxygen-permeable lenses are formed having good impact strength with reduced brittleness as compared to prior art organosilane-containing contact lenses.

According to the invention a contact lens is formed of an unsaturated multifunctional organosilane having the formula $$\begin{bmatrix} Y \\ | \\ X \\ | \\ A-Si-A \\ | \\ O \\ \end{bmatrix}_a \begin{bmatrix} Y \\ | \\ X \\ | \\ A-Si-A \\ | \\ O \\ \end{bmatrix}_a \begin{bmatrix} Y \\ | \\ X \\ | \\ A-Si-A \\ | \\ O \\ \end{bmatrix}_a$$

$$Y'-X'-Si-O-\begin{bmatrix} Si-O \end{bmatrix}-Si-X'-Y'$$

$$\begin{bmatrix} O \\ | \\ A-Si-A \\ | \\ X \\ | \\ Y \end{bmatrix}_a \begin{bmatrix} O \\ | \\ A-Si-A \\ | \\ X \\ | \\ Y \end{bmatrix}_a \begin{bmatrix} O \\ | \\ A-Si-A \\ | \\ X \\ | \\ Y \end{bmatrix}_a \Bigg]_n$$

WHEREIN:

Y' is an unsaturated polymerizable group,

X' is a divalent hydrocarbon having from 0 to 10 carbons,

Y is an unsaturated polymerizable group or hydrogen,

X is a divalent hydrocarbon having from 1 to 10 carbon atoms, or phenylene,

A is selected from the class consisting of straight chain, branched chain, or cyclic alkyl groups having 1 to 5 carbon atoms, phenyl groups and "Z" groups, Z is a group selected from the following:
   trimethyl siloxy
   pentamethyl disiloxanyl
   heptamethyl trisiloxanyl
   nonamethyl tetrasiloxanyl
   bis(trimethylsiloxy)methyl siloxanyl
   Tris(trimethylsiloxy) siloxanyl "a" is an integer from 0 to 10. The total of "a" values is at least 2, "n" is an integer from 0 to about 10, and each of said X, X', Y, Y', a, A and Z groups being the same or different.

Preferably the organosiloxane is selected from the class consisting of 1,3-Bis(γ-methacryloxypropyl)-1,1,3,3 tetra(trimethylsiloxy)disiloxane, 1,3-Bis(γ-methacryloxypropyl)-1,1,3,3 tetra[Bis(trimethylsiloxy)-methyl siloxanyl]disiloxane, 1,3-Bis(γ-methacryloxy-propyl)-1,1,3,3 tetra(pentamethyldisiloxanyl)disiloxane, 1,7-Bis(γ-methacryloxypropyl)-1,1,3,3,5,5,7,7-octa(-trimethylsiloxy)tetrasiloxane, 1,3-Bis(γ-methacryloxy methyl)-1,1,3,3 tetra(trimethylsiloxy)disiloxane, tetra[γ-methacryloxypropyl dimethylsiloxy]silane, 1,7-Bis(γ-methacryloxypropyl)-1,1,7,7-tetra (pentamethyl disiloxanyl)-3,3,5,5-tetra(trimethylsiloxy)tetrasiloxane, Tris(γ-methacryloxypropyl tetramethyl disiloxanyl)methyl silane.

The following new compositions which are multifunctional organosilanes having properties particularly useful as contact lenses have been provided by the present invention:

1,7-Bis(γ-methacryloxypropyl)-1,1,3,3,5,5,7,7-octa (trimethylsiloxy)tetrasiloxane 1,7-Bis(γ-methacryloxypropyl)-1,1,7,7-tetra(pentamethyl disiloxanyl)-3,3,5,5,-tetra(trimethylsiloxy)tetrasiloxane Preferably the material used for forming the contact lens if not a multifunctional unsaturated organosiloxane substantially alone can be a combination of such organosiloxane as described above with a contact lens significant amount of monofunctional organosiloxane having the formula:

$$\begin{array}{c} R \\ | \\ CH_2=C \\ | \\ C=O \\ | \\ O \\ | \\ (CH_2)_a \\ | \\ A-\begin{bmatrix} A \\ | \\ Si-O \\ | \\ A \end{bmatrix}_b - Si - \begin{bmatrix} O-Si \begin{array}{c} A \\ | \\ | \\ A \end{array} \end{bmatrix}_b - A \\ | \\ \begin{bmatrix} O \\ | \\ A-Si-A \\ | \\ A \end{bmatrix}_b \end{array}$$

WHEREIN:

R is selected from the class consisting of methyl groups and hydrogen, "a" is an integer from 1 to 4, A is selected from the class consisting of straight chain, branched chain, or alkyl groups of from 1 to 5 carbon atoms, cyclohexyl groups, phenyl groups and Z groups, Z is a group selected from trimethyl siloxy, pentamethyl disiloxanyl, heptamethyl trisiloxanyl, nonamethyl tetrasiloxanyl, bis(trimethylsiloxy) methyl siloxanyl, tris(trimethylsiloxy) siloxanyl, "b" is an integer from 0 to 10, each "b", "A" and Z may be the same or different, and the total of "b" values being at least 1.

Preferably contact lens compositions can comprise a multifunctional organosiloxane alone or mixed with a monofunctional monomer or mixtures thereof. Difunctional organosiloxanes are preferred. The mixture can have incorporated therein a wetting agent such as a hydrophilic monomer. Preferably a hardening agent such as methyl methacrylate is also incorporated and in the preferred embodiment, hydrophilic hardening agents such as itaconates are also incorporated.

It has now been found that often when prior art lenses of the type fabricated in accordance with U.S. Pat. No. 4,152,508 are formed, a small amount of multifunctional organosiloxane is mixed with the original monofunctional organosiloxane monomer. This mixture has been an unwanted result of ordinary manufacture of the monomer. It has now been found that higher amounts of multifunctional organosiloxane to monofunctional siloxane than previously present are highly desirable to increase impact resistance and hardness while still retaining other desirable contact lens properties.

It is a feature of this invention that contact lenses made from the materials of this invention are preferably hard, but can be semi-hard or soft, oxygen-permeable contact lenses having good dimensional stability and high transparency. Because of the multifunctional organosiloxane used, they have high impact strength and reduced brittleness. It is believed that a greater degree of cross-linking occurs when polymerizing multifunctional organosiloxanes so that the final products have greater cross-link density than would be the case with monofunctional organosiloxanes. This increased impact strength with increased cross-link density is surprising. The contact lenses of this invention are easily fabricated and finished by conventional means, have excellent dimensional stability, are inherently wettable with suitable refractive index and have good light transmission properties. Such lenses are durable, have good oxygen gas permeability, are biocompatible with the eye, substantially non-hydrating, are chemically stable and have resistance to proteinaceous accumulation with reasonable scratch resistance. They can be worn safely and comfortably by users for extended periods of time while providing the wearer with good vision. This minimizes handling of the lenses and greatly improves anticipated life.

DESCRIPTION OF PREFERRED EMBODIMENTS

Contact lenses which derive their oxygen permeability from poly(organosiloxane) moieties require a substantial content of poly(organosiloxane) to provide sufficient oxygen transport to the cornea.

In general poly(organosiloxane) molecules tend to be incompatible in many compositions which include other monomers. For example, dissolving poly(dimethylsiloxane) in methyl methacrylate and polymerizing said solution will result in an opaque material unsuitable for contact lens use.

Prior art has demonstrated that short organosiloxane units chemically bonded to an unsaturated, polymerizable group provides a means of copolymerizing such organosiloxane monomers with other monomers to achieve a compatible, therefore, transparent material.

On the other hand, organosiloxane units containing only one unsaturated, polymerizable group often times will not provide a random copolymer when copolymerized with other monomers, particularly hydrophilic monomers. This situation leads to phase separation and therefore an opaque material. In certain cases the phase separation is not detectable visually but is evidenced in the physical properties of the material. This condition can provide a material that exhibits brittle behavior and a propensity to fracture.

The physical properties of highly cross-linked polymer prepared from dimethyl siloxane diacrylate oligomers has been known in the art. In general, microphase separation is suppressed as the amount of dimethylsiloxane groups in the prepolymer increases. This phenomenon is attributed to the absence of long organic sequences. Overall, the work of Katz J. Polym. Sci. Chem. Ed. 16(3) 597 (1978) teaches against the copolymerization of such reactive organosiloxane monomers since organic sequences form leading to phase separation. However, in a contact lens material it has been found desirable to include one or more comonomers to provide a proper balance of physical properties.

For contact lens applications it is therefore desirable to provide a random copolymer that contains a substantial amount of compatibilized organosiloxane units. The novel method disclosed herein utilizes branched organosiloxane structures containing multiple unsaturated, polymerizable groups. These materials, when copolymerized with other monomers provide compositions which are transparent, highly oxygen-permeable and durable. The random nature of the polymerization process is enhanced by the presence of multiple, unsaturated polymerizable groups. The compatibilization of the organosiloxane monomers disclosed is improved through the use of highly branched organosiloxane moieties.

This invention also demonstrates the effectiveness of balancing the cross-link density, in the final composition, through the use of a combination of an organosiloxane containing one unsaturated polymerizable group with an organosiloxane containing multiple unsaturated, polymerizable groups. Compositions of this type exhibit a combination of desirable contact lens properties not found in systems where only one of the organosiloxane monomers is present.

Physical properties of the compositions disclosed in this invention can be varied through structural changes in the multifunctional organosiloxane component and/or by varing the type and percent of comonomer.

In one embodiment of this invention is provided oxygen transporting, transparent, inherently wettable contact lenses comprising a polymer made from an organosiloxane containing multiple, unsaturated polymerizable groups.

In another embodiment of this invention are provided polymeric compositions comprising an organosiloxane containing multiple, unsaturated polymerizable groups copolymerized with one or more monomers from the class of lower esters of acrylic, methacrylic, styryls, allyls or vinyls. These copolymers are permeable, transparent and durable which allows them to be usefully employed in bulk or shaped forms such as contact lenses.

The polymeric compositions of this invention are preferably prepared by means of conventional free radical polymerization techniques. The free radical initiator is incorporated in amounts of from 0.01 to 2.0% by weight of the entire composition, at reaction temperatures of from 25° C. to 125° C., to initiate and complete the polymerization. Conventional bulk polymerization procedures can be used to produce castings which can be machined and polished by conventional procedures to produce contact lenses. Alternatively, the polymerization may be carried out directly in a contact lens mold.

It is a feature of this invention that the multifunctional organosiloxane provides for high oxygen permeability while strength and biocompatibility are provided by other portions of the copolymer. The use of methacrylate or acrylate esters provide for strength and hardness (or resiliency). Incorporation of a hydrophilic monomer greatly increases the wettability of the material to achieve biocompatibility.

The novel compositions disclosed in this invention are prepared from an organosiloxane containing multiple, unsaturated polymerizable groups. Optical contact lenses are fabricated from polymerizates of these monomers preferably incorporating other comonomers to provide the proper balance of physical and chemical properties desired in a contact lens. Typically, the organosiloxane multifunctional monomers useful in this invention which can be formed into contact lenses alone or copolymerized with other organic components, have the following formula:

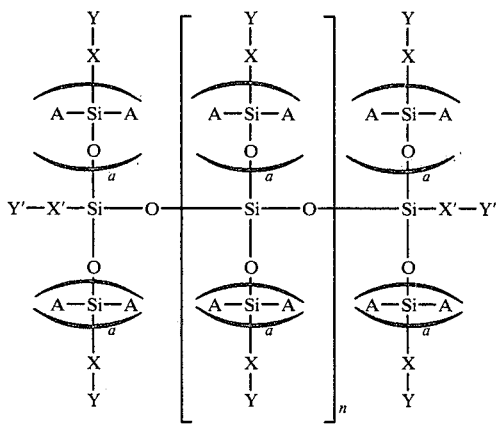

WHEREIN:
Y' is an unsaturated polymerizable group,
X' is a divalent hydrocarbon having from 0 to 10 carbons,
Y is an unsaturated polymerizable group or hydrogen,
X is a divalent hydrocarbon having from 1 to 10 carbon atoms, or phenylene,
A is selected from the class consisting of straight chain, branched chain, or cyclic alkyl groups having 1 to 5 carbon atoms, phenyl groups and "Z" groups,
Z is a group selected from the following:
trimethyl siloxy
pentamethyl disiloxanyl
heptamethyl trisiloxanyl
nonamethyl tetrasiloxanyl
bis(trimethylsiloxy)methyl siloxanyl
Tris(trimethylsiloxy) siloxanyl It is understood that the examples given above should not limit the invention to methylsubstituted siloxanes since phenyl (substituted and unsubstituted), cyclohexyl and other groups are useful in this invention either alone or in combinations. In some cases, the hydrocarbon groups can be substituted with other atoms such as halogens if desired optical and physical properties are not impaired. Each "X", "X'", "Y", "Y'", "A" and "Z" group shown in the general structure may be the same or different.

"a" is an integer from 0 to 10. The total of "a" values is at least 2,
"n" is an integer from 0 to about 10.

Preferably, the unsaturated polymerizable group of Y and Y' chosen from among
vinyl
methacryloxy
acryloxy
methacrylamido
acrylamido
styryl
allyl Preferably the alkylene radical group of X and X' is chosen from among:
methylene
ethylene
propylene
butylene Preferbly "A" is chosen from the class of alkyl, cycloalkyl, aryl, aralkyl, alkaryl, haloaryl and halo substituted lower alkyl radicals. Representative examples includes:
methyl
ethyl
propyl
butyl
cyclohexyl
phenyl
benzyl
phenethyl
tolyl
xylyl
chlorophenyl
fluorophenyl
fluoromethyl
fluoropropyl
trifluoropropyl The "A" group can also be a "Z" group which, preferably, is chosen from among:
trimethyl siloxy
pentamethyl disiloxanyl
heptamethyl trisiloxanyl
nonamethyl tetra siloxanyl
bis(trimethylsiloxy)methyl siloxanyl
tris(trimethylsiloxy)siloxanyl
phenyl dimethyl siloxy
methyl diphenyl siloxy
phenyl tetra methyl disiloxanyl The multifunctional organosiloxane monomers employed in this invention are prepared utilizing techniques widely known in the art.

Representative multifunctional organosiloxane monomers which could be utilized in this invention include:

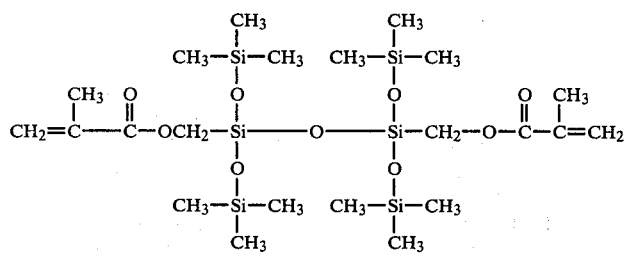

1,3-Bis(γ-methacryloxymethyl)-1,1,3,3 tetra (trimethylsiloxy)disiloxane

-continued
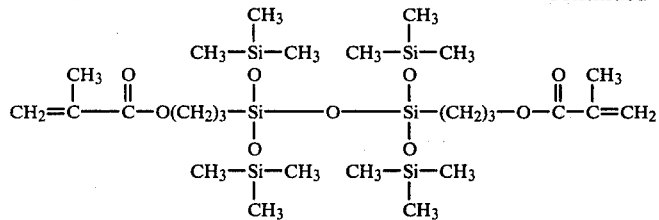
1,3-Bis(γ-methacryloxypropyl)-1,1,3,3 tetra(trimethylsiloxy)disiloxane
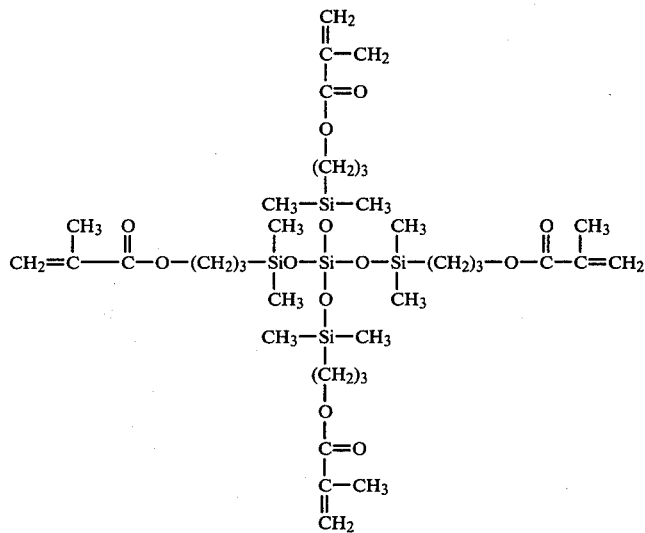
Tetra[γ-methacryloxypropyl dimethylsiloxy]silane
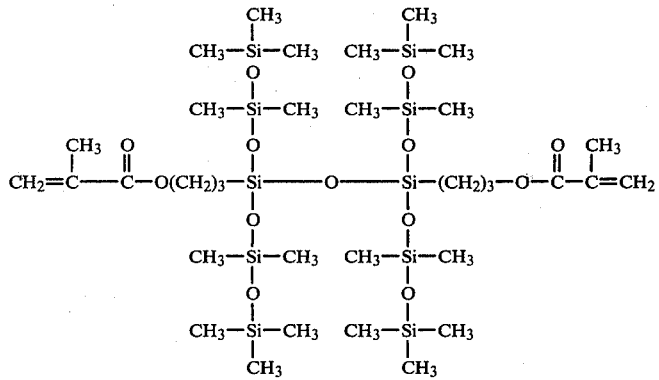
1,3-Bis(γ-methacryloxypropyl)-1,1,3,3 tetra(pentamethyl disiloxanyl)disiloxane
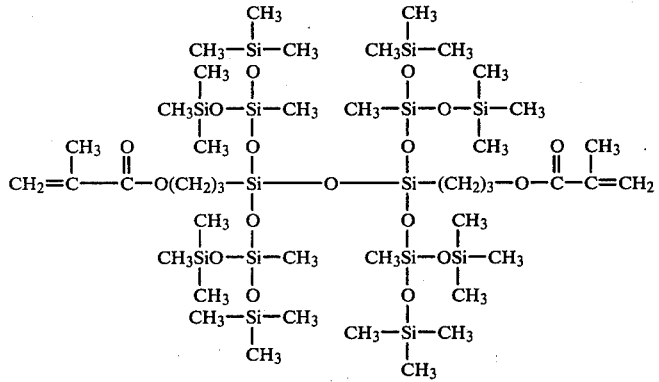
1,3-Bis(γ-methacryloxypropyl)-1,1,3,3 tetra[Bis(trimethylsiloxy)methyl siloxanyl]disiloxane

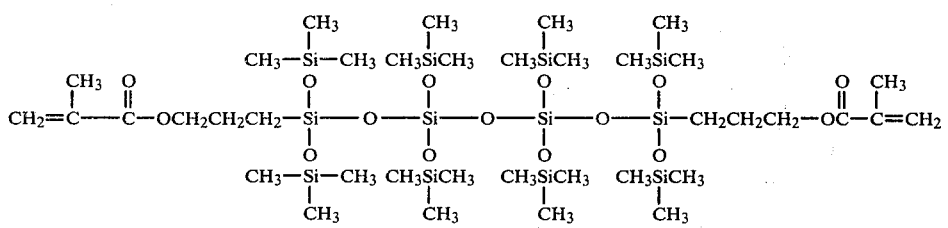

1,7-Bis(γ-methacryloxypropyl)-1,1,3,3,5,5,7,7-octa(trimethylsiloxy)tetra siloxane

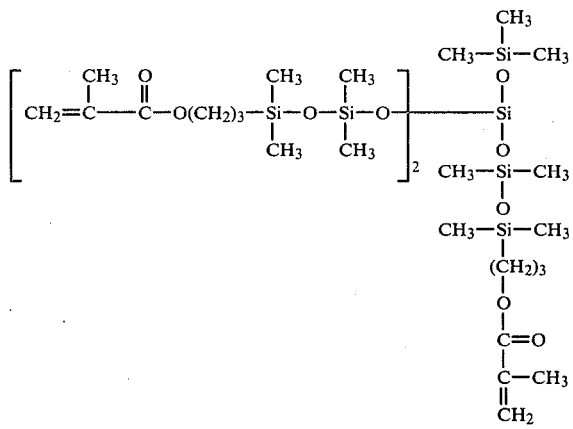

Tris(γ-methacryloxy propyl tetramethyl disiloxanyl)trimethyl siloxy silane

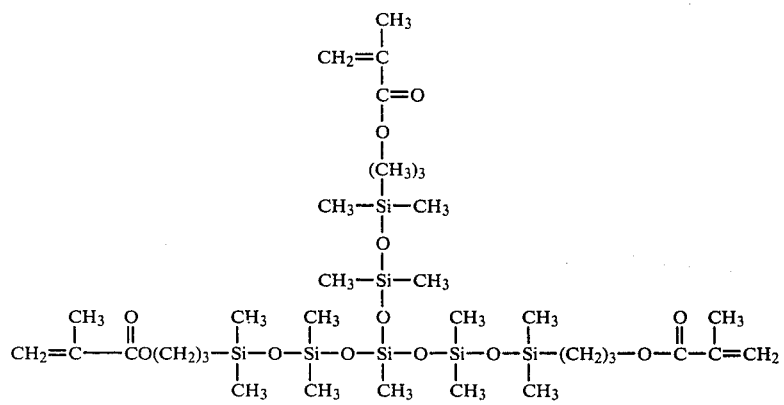

Tris(γ-methacryloxypropyl tetramethyl disiloxanyl)methyl silane

It is another object of this invention to provide polymerizates of monomers which are multifunctional organosiloxanes copolymerized with other monomers.

The comonomers used along with the multifunctional organosiloxanes in lens compositions of this invention, can be any polymerizable monomer which is capable of undergoing free radical polymerization and enhances a desirable property such as machinability, durability and biocompatibility.

Illustration of comonomers which can be usefully employed in accordance with this invention are given below.

Preferably the comonomers can be hardening or softening agents such as an ester of a $C_1$-$C_{21}$ monohydric or polyhydric alkanol or phenol and an acid selected from the class consisting essentially of acrylic acid methacrylic acid. A hydrophilic hardening agent such as an itaconate mono- or di-ester is preferably used in addition.

The derivatives of acrylic, methacrylic and itaconic acid such as methyl
ethyl
propyl
n-butyl
isopropyl
hexyl
hepyl
cyclohexyl
2-ethylhexyl
ethoxyethyl
butoxyethyl
2-hydroxyethyl
2- or 3-hydroxypropyl
3-methoxy-2-hydroxypropyl tetrahydrofurfuryl
aryl
allyl
glycidoxy
are useful.

Other comonomers may include N-vinylcarbazole, N-vinylpyrrolidone, hydroxy naphthyl methacrylate, styryls, such as styrene, methylstyrene, methoxy styrene and acetoxy styrene.

Allylic monomers, such as diallyl diglycol dicarbonate, diallyl phthalate, diallyl carbonate and triallyl cyanurate are also useful comonomers.

The wettability of the compositions disclosed in this invention may be enhanced by the inclusion of hydrophilic neutral monomers, hydrophilic cationic monomers and hydrophilic anionic monomers and mixtures of these. The classes of these compounds are hydrophilic arylates and methacrylates, acrylamides, methacrylamides and vinyl-lactams.

Representative hydrophilic neutral monomers which impart hydrophilic properties to the surface of contact lens materials of this invention include:
N-vinylpyrrolidone
acrylamide
methacrylamide
N,N-dimethylacrylamide
2-hydroxyethyl acrylate or methacrylate
2- or 3-hydroxypropyl acrylate or methacrylate
glyceryl acrylate or methacrylate
glycidyl acrylate or methacrylate
3-methoxy-2-hydroxypropyl acrylate or methacrylate
mono esters of acylic and methacrylic acid with polyethers of the general formula:

$$HO(C_nH_{2n}O)_xH$$

Wherein "n" is a number from 1 to about 4 and "x" is a number from 2 to about 10.

The cationic hydrophilic monomers either can be initially in their charged form or are subsequently converted to their charged form after formation of the contact lens. The classes of these compounds are derived from basic or cationic acrylates, methacrylates, acrylamides, methacrylamides, vinylpyridines, vinylimidazoles, and diallyldialkylammonium polymerizable groups. Such monomers are represented by:
N,N-dimethylaminoethyl acrylate and methacrylate
2-methacryloyloxyethyltrimethylammonium chloride and methylsulfate
2-,4-, and 2-methyl-5-vinylpyridine
2-,4-, and 2-methyl-5-vinylpyridinium chloride and methylsufate
N-(3-methacrylamidopropyl)-N,N-dimethylamine
N-(3-methacrylamidopropyl)-N,N,N-trimethylammonium chloride
N-(3-methacryloyloxy-2-hydroxylpropyl)-N,N,N-trimethylammonium chloride
diallyldimethylammonium chloride and methylsulfate The anionic hydrophilic monomers either are in their neutral form initially or are subsequently converted to their anionic form. These classes of compounds include polymerizable monomers which contain carboxy, sulfonate, and phosphate or phosphate groups. Such monomers are represented by:
acrylic acid
methacrylic acid
sodium acrylate and methacrylate
vinylsulfonic acid
sodium vinylsulfonate
p-styrenesulfonic acid
sodium p-styrenesulfonate
2-methacryloyloxyethylsulfonic acid
3-methacryloyloxy-2-hydroxypropylsulfonic acid
2-acrylamido-2-methylpropanesulfonic acid
allylsulfonic acid
2-phosphatoethyl methacrylate The copolymers described in this invention are prepared by radical polymerization through the incorporation of a free radical initiator. The initiator is chosen from those commonly utilized to polymerize vinyl type monomers and would include the following representative initiators:
2,2'-azo-bis-isobutyronitrile
4,4'-azo-bis-(4-cyanopentanoic acid)
t-butyl peroctoate
benzoyl peroxide
lauroyl peroxide
methyl ethyl ketone peroxide
diisopropyl peroxycarbonate The free radical initiator is normally used in amounts of from 0.01 to 2% by weight of the entire compound.

The materials of this invention can be polymerized directly in a suitable mold to form contact lenses. The materials are all thermosetting and thus various methods of fabrication can be used. It is preferable to polymerize into sheet or rod stock from which contact lenses may be machined.

It is preferred to use the conventional approach when forming contact lenses such as used for polymethyl methacrylate (PMMA). In this approach, the formulations are polymerized directly into a sheet or rod and the contact lenses are cut as buttons, discs or other preformed shapes which are then machined to obtain the lens surfaces. The resulting polymeric stock of buttons possesses the optical qualities necessary to produce aberration-free oxygen-permeable, hard contact lenses in accordance with this invention.

The multifunctional organosiloxane monomers of this invention provide many advantages when utilized as the basis for contact lens materials. The disclosed monomers are substantially organosiloxane but contain multiple functional groups which allows for rapid incorporation into a copolymer system by free radical polymerization. Furthermore, because of the presence of the multifunctional, polymerizable groups the organosiloxane portion is compatibilized in the copolymer structure.

The oxygen demand of the human cornea has been well established and contact lenses made from the polymers and copolymers of this invention can meet and easily exceed this requirement.

Because of the unique properties of the compositions, the contact lenses formed thereof have high oxygen permeability while maintaining other essential properties such as clarity, wettability and durability.

The following Examples are given to illustrate the invention and not meant to be limiting:

EXAMPLE 1

Synthesis of 1,3-Bis(γ-methacryloxypropyl)-1,1,3,3tetra(trimethylsiloxy)disiloxane A catalyst solution is prepared by adding, with stirring, 52 ml of concentrated sulfuric acid to a cooled mixture of 59 ml absolute ethanol and 66 ml of distilled water.

A 2000 ml round bottom flask, equipped with a magnetic stirring bar, is placed in a suitable size container which will function as a water bath. To the flask is added 300 ml (1.26 moles) of γ-methacryloxypropyl trimethyloxysilane and 375 ml (2.54 moles) of trimethylacetoxysilane. The bath vessel is filled with water at a temperature of between 20° and 30° C. While stirring, 60 ml of catalyst solution (prepared earlier) is added dropwise from a dropping funnel into the flask. After the catalyst addition is complete, the reaction mixture is stirred at room temperature for 72 hours. The upper oily layer is separated and washed with two volumes of distilled water. The organic layer is then isolated and stripped of low boiling contaminants by vacuum distillation at a temperature of between 50° and 60° C. The monomer is then decolored with activated carbon yielding approximately 275 ml of 1,3-Bis(γ-methacryloxypropyl)-1,1,3,3-tetra(trimethylsiloxy)disiloxane. This material is designated SM-6.

EXAMPLE 2

Synthesis of 1,7-Bis(γ-methacryloxypropyl)-1,1,3,3,5,5,7,7-octa(-trimethylsiloxy)tetrasiloxane This monomer was prepared in a manner similar to that described in Example 1. The reactants were γ-methacryloxypropyltrimethyloxysilane (2 moles) 1,3, Bis acetoxy-1,1,3,3 tetra(trimethylsiloxy)disiloxane (1 mole) and Trimethylacetoxysilane (4 moles). This material is designated SM-12.

EXAMPLE 3

Synthesis of 1,3-Bis(γ-methacryloxaypropyl)-1,1,3,3 Tetra(pentamethyldisiloxanyl)disiloxane This monomer was prepared in a manner similar to that described in Example 1. The reactants were γ-methacryloxypropyltrimethyloxysilane (2 moles) and acetoxypentamethyldisiloxane (4 moles). This material is designated SM-10.

EXAMPLE 4

Synthesis of 1,7-Bis(γ-methacryloxypropyl)-1,1,7,7-TETRA(Pentamethyldisiloxyanyl)-3,3,5,5-TETRA(Trimethylsiloxy)Tetrasiloxane This monomer was prepared in a manner similar to that described in Example 1. The reactants were γ-methacryloxypropyltrimethyloxysilane (2 moles), 1,3-Bis(acetoxy)-1,1,3,3-TETRA(trimethylsiloxy)disiloxane (1 mole) and acetoxypentamethyldisiloxane (4 moles). This material is designated SM-16.

EXAMPLE 5

Hard, oxygen-permeable lenses are made from a co-monomer mixture of methyl methacrylate (MMA), 1,3-Bis(γ-methacryloxypropyl)-1,1,3,3 tetra(trimethylsiloxy)disiloxane (SM-6) and methacrylic acid (MA) using the free radical initiator 2,2'-azobisisobutyronitrile (AIBN). The formulation components (shown in Table I in parts by weight) are thoroughly mixed, transferred to test tubes which are purged with nitrogen then sealed with serum caps. The test tubes are then placed in a water bath at 40° C. and allowed to polymerize for three days. The tubes are then placed in a 65° C. oven for an additional time period of three days, after which the polymerized rods are removed from the tubes. The hard, transparent rods are then subjected to conditioning for approximately twenty-four (24) hours at 100° C. under vacuum to complete polymerization process and relieve any mechanical stresses present. The conditioned rods are then machined to contact lens blanks (a disc ½ inch in diameter by 3/16 inch thick).

Oxygen permeability values of the contact lenses were generated by a procedure as described in ASTM D1434 except that plano contact lenses are used instead of large flat discs of material. The permeability apparatus was constructed in such a manner as to accept actual contact lenses and calibrated with other polymeric oxygen permeability data reported in Table I, polymethyl methacrylate, polycarbonate, and polystyrene have oxygen permeabilities of 1, 22, and 35 $cm^3$ mm/$cm^2$ sec cm Hg$\times 10^{-10}$, respectively. The formulations of Table I illustrate the change in oxygen permeability with a change in MMA and SM-6 concentrations.

TABLE I

| Composition (wt. percent reagent) | | | | Oxygen Permeability* |
|---|---|---|---|---|
| MMA | SM-6 | MA | AIBN | |
| 57.1 | 38.0 | 4.7 | 0.2 | 36 |
| 52.3 | 42.8 | 4.7 | 0.2 | 66 |
| 47.5 | 47.6 | 4.7 | 0.2 | 107 |
| 42.8 | 52.3 | 4.7 | 0.2 | 148 |

*Value in $cm^3$ mm/$cm^2$ sec cm Hg $\times 10^{10}$

EXAMPLE 6

Utilizing the experimental procedures of Example 3 this Example illustrates the preparation and properties of materials suitable for semi-rigid and flexible contact lenses.

| Composition (wt. percent reagent) | | | | Properties |
|---|---|---|---|---|
| EEA* | SM-6 | MA | AIBN | |
| 57.0 | 38.0 | 4.8 | 0.2 | T,F |
| 35.0 | 60.0 | 4.8 | 0.2 | T,SR |

*Ethoxyethylacrylate
T = Transparent
F = Flexible
SR = Semi-rigid

EXAMPLE 7

Utilizing the Experimental Procedures of Example 3 this Example illustrates the preparation and properties of materials suitable for producing hard contact lenses.

| Composition (Net percent reagent) | | | | Properties |
|---|---|---|---|---|
| MMA | SM-12 | MA | AIBN | |
| 69.9 | 29.9 | — | 0.2 | T,H |
| 66.5 | 28.5 | 4.8 | 0.2 | T,H |
| 59.9 | 19.9 | — | 0.2 | T,H |
| 57.0 | 38.0 | 4.8 | 0.2 | NT,H |
| 49.9 | 49.9 | — | 0.2 | T,H |

-continued

| Composition (Net percent reagent) | | | | Properties |
|---|---|---|---|---|
| MMA | SM-12 | MA | AIBN | |
| 47.5 | 47.5 | 4.8 | 0.2 | NT,H |

T = Transparent
H = Hard
NT = Hazy

-continued

| Composition (wt. percent reagent) | | | | Properties | |
|---|---|---|---|---|---|
| MMA | SM-16 | MA | AIBN | Appearance | Hardness* |
| 57.0 | 38.0 | 4.8 | 0.2 | H,T | 115 |

H = Hard
T = Transparent
*Rockwell R

EXAMPLE 8

Utilizing the experimental procedures of Example 5 this Example illustrates the preparation and properties of materials suitable for hard contact lenses.

| Composition (wt. percent reagent) | | | | Properties | |
|---|---|---|---|---|---|
| MMA | SM-10 | MA | AIBN | Appearance | Hardness* |
| 59.8 | 40.0 | — | 0.2 | H,T | 116 |
| 57.0 | 38.0 | 4.8 | 0.2 | H,T | 117 |
| 47.5 | 47.5 | 4.8 | 0.2 | H,T | 113 |

H = Hard
T = Transparent
*Rockwell R

EXAMPLE 9

Utilizing the experimental procedures of Example 5 this Example illustrates the preparation and properties of materials suitable for hard contact lenses.

| Composition (wt. percent reagent) | | | | Properties | |
|---|---|---|---|---|---|
| MMA | SM-16 | MA | AIBN | Appearance | Hardness* |
| 69.8 | 30.0 | — | 0.2 | H,T | 118 |
| 59.8 | 40.0 | — | 0.2 | H,T | 114 |
| 66.5 | 28.5 | 4.8 | 0.2 | H,T | 118 |

EXAMPLE 10

The following Example illustrates the use of a multifunctional, unsaturated organosiloxane in conjunction with a monofunctional unsaturated organosiloxane to provide an oxygen permeability contact lens material with improved impact strength.

The procedures described in Example 5 were utilized in preparing the copolymers.

Impact behavior was determined by dropping a steel ball (11/32 inch diameter, 2.75 gms) down a plastic tube onto the convex surface of a contact lens. The lens was positioned on a flat steel table so that the ball impacted the center of the lens. The specifications of the test lens are as follows:

Base Curve 7.80 mm to 7.90 mm
Power −6.75 to −7.25 diopters
thickness 0.10 mm to 0.12 mm A number of lenses were tested and the height at which 50% of the samples failed (crack, hole or shatter) was called out as the drop impact resistance.

| Composition (wt. percent reagent) | | | | | Properties | | |
|---|---|---|---|---|---|---|---|
| MMA | SM-6 | TRIS* | MA | AIBN | Rockwell R Hardness | Oxygen** Permeability | Drop*** Impact |
| 47.5 | — | 47.5 | 4.8 | 0.2 | 119 | 179 | 12 |
| 47.5 | 19.0 | 28.5 | 4.8 | 0.2 | 119 | 161 | 16 |
| 47.5 | 28.5 | 19.0 | 4.8 | 0.2 | 118 | 143 | 18 |
| 47.5 | 38.0 | 9.5 | 4.8 | 0.2 | 118 | 130 | 19 |

*Methacryloxypropyl tris (trimethylsilyl)siloxane
**Value in $cm^3$ mm/$cm^2$ sec cm Hg × $10^{-10}$
***Height in inches The following table illustrates the general combinations of materials as preferred for use in the present invention to form polymerized organosiloxane materials in a form suitable for machining or casting as contact lenses:

| | | Formulation I | Formulation II | Formulation III |
|---|---|---|---|---|
| oxygen permeable material | multifunctional unsaturated organosiloxane or mixture thereof —30 to 100% by weight monofunctional unsaturated organosiloxane 70-0% by weight of organosiloxane | 80–90% | 55–98% | 35–97% |
| hardening or softening agent | ester of a $C_1$–$C_{20}$ monohydric or polyhydric alkanol or phenol and acid selected from the class consisting essentially of acrylic and methacrylic acid | 0 | 1–45% | 1–45% |
| Wetting Agent | Hydrophilic monomer or mixture thereof | 1–20% | 1–20% | 1–20% |
| Hydrophilic hardening agent | Itaconate or mixtures thereof | 0 | 0 | 1–20% |

The above Examples are merely illustrative of the present invention. Many combinations are possible. Both hard and semi-hard contact lenses can be advantageously produced using the compositions of this invention. In some cases soft lenses will have advantages because of the multifunctional unsaturated organosiloxanes used. In all cases, contrary to prior art thinking in the oxygen permeable contact lens commercial field, multifunctional materials are found useful rather than monofunctional materials. Usual additives such as tints, colorants, antioxidants, stabilizers, absorbers and the like can be incorporated in the formulations of this invention if desired. All lenses can have conventional hardening agents, softening agents, wetting agents, hydrophilic hardening agents and the like incorporated therein so long as desired conact lens properties are retained.

In the lenses of this invention and the following claims, mixtures of monofunctional unsaturated organosiloxanes of the general formula given can be used in the combinations claimed and mixtures of the unsaturated multifunctional organosiloxanes of the general formula given can be used alone and in such combinations and are considered full equivalents included in the claimed structures.

A "contact lens significant amount" of multifunctional, unsaturated organosiloxane as used herein refers to an amount higher than previously known in contact lenses and effective to improve hardness above that obtained with the monomer as normally used.

I claim:

1. A contact lens comprised substantially of a polymer formed by free radical polymerization of an unsaturated, multifunctional, organosiloxane having the formula

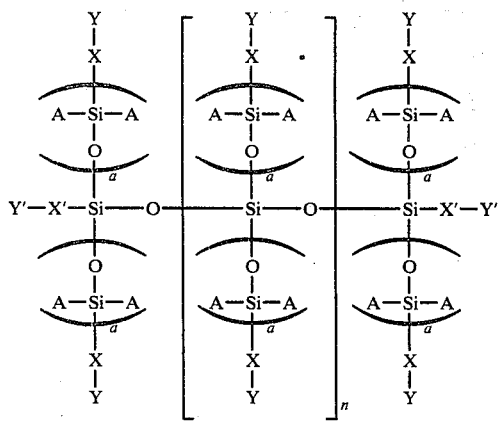

wherein:
Y' is an unsaturated polymerizable group selected from the group consisting of vinyl, methacryloxy, acryloxy, methacrylamido, acrylamido, styryl and allyl,
X' is a divalent hydrocarbon having from 0 to 10 carbons,
Y is an unsaturated polymerizable group selected from the group consisting of vinyl, methacryloxy, acryloxy, methacrylamido, acrylamido, styryl, allyl and hydrogen,
X is a divalent hydrocarbon having from 1 to 10 carbon atoms, or phenylene,
A is selected from the group consisting of straight chain alkyl groups having 1 to 5 carbon atoms, branched chain, or cyclic alkyl groups having 3 to 5 carbon atoms, phenyl group and "Z" groups, Z is a group selected from the following:
trimethyl siloxy,
pentamethyl disiloxanyl,
heptamethyl trisiloxanyl,
nonamethyl tetrasiloxanyl,
bis(trimethylsiloxy)methyl siloxanyl, or
tris(trimethylsiloxy)siloxanyl
"a" is an integer from 0 to 10, the total of "a" values is at least 2,
"n" is an integer from 0 to about 10, and each of said X, X', Y, Y', a, A and Z groups each individually being the same or different.

2. A contact lens in accordance with claim 1 wherein said organosiloxane is 1,3-bis(γ-methacyloxypropyl)-1,1,3,3 tetra(trimethylsiloxy)disiloxane.

3. A contact lens in accordance with claim 1 wherein said organosiloxane is 1,3-bis(γ-methacryloxypropyl)-1,1,3,3 tetra(trimethylsiloxy)disiloxane.

4. A contact lens in accordance with claim 1 wherein said organosiloxane is tetra silane.

5. A contact lens in accordance with claim 1 wherein said organosiloxane is 1,3-bis(γ-methacryloxypropyl)-1,1,3,3 tetra(pentamethyl disiloxanyl)disiloxane.

6. A contact lens in accordance with claim 1 wherein said organosiloxane is 1,3-bis(γ-methacryloxypropyl)-1,1,3,3 tetra disiloxane.

7. A contact lens in accordance with claim 1 wherein said organosiloxane is 1,7-bis(γ-methacryloxypropyl)-1,1,3,3,5,5,7,7-octa(trimethylsiloxy)tetra siloxane.

8. A contact lens in accordance with claim 1 wherein said organosiloxane is tris(γ-methacryloxypropyl tetramethyl disiloxanyl)trimethylsiloxy silane.

9. A contact lens in accordance with claim 1 wherein said organosiloxane is 1,7-bis(γ-methacryloxypropyl)-1,1,7,7-tetra(pentamethyl disiloxanyl)-3,3,5,5-tetra(-trimethylsiloxy)tetrasiloxane.

10. A contact lens in accordance with claim 1 wherein said organosiloxane is tris(γ-methacryloxypropyl tetramethyl disiloxanyl)methyl silane.

11. A contact lens material comprising a polymeric material formed from free radical polymerization of a monomeric mixture comprising a significant amount of a multifunctional, unsaturated, organosiloxane having the formula:

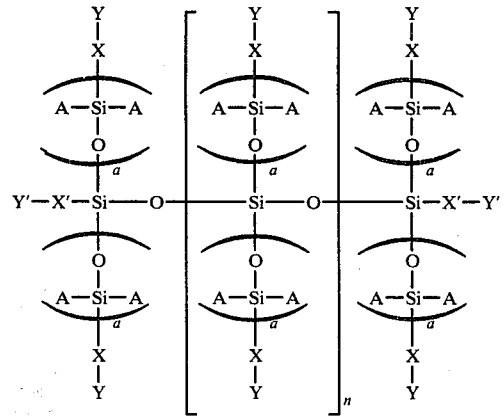

wherein:
Y' is an unsaturated polymerizable group selected from the group consisting of vinyl, methacryloxy, acryloxy, methacrylamido, acrylamido, styryl and allyl, X' is a divalent hydrocarbon having from 0 to 10 carbons, Y is an unsaturated polymerizable group selected from the group consisting of vinyl, methacryloxy, acryloxy, methacrylamido, acrylamido, styryl, allyl and hydrogen, X is a divalent hydrocarbon having from 1 to 10 carbon atoms, or phenylene, A is selected from the group consisting of straight chain alkyl groups having 1 to 5 carbon atoms, branched chain, or cyclic alkyl groups having 3 to 5 carbon atoms, phenyl group and "Z" groups, Z is a group selected from the following:
trimethyl siloxy,
pentamethyl disiloxanyl,
heptamethyl trisiloxanyl,
nonamethyl tetrasiloxanyl,
bis(trimethylsiloxy)methyl siloxanyl or
tris(trimethylsiloxy)siloxanyl "a" is an integer from 0 to 10, the total of "a" values is at least 2, "n" is an integer from 0 to about 10, and each of said X, X', Y, Y', a, A and Z groups each individually being the same or different and a monofunctional, unsaturated organosiloxane monomer having the formula:

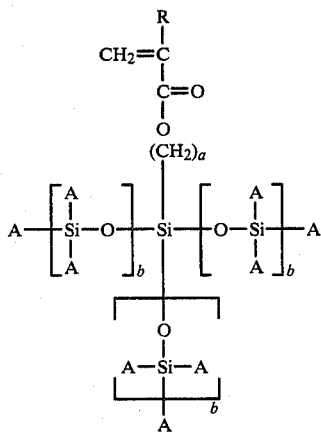

wherein:

R is selected from the group consisting of methyl groups and hydrogen,

"a" is an integer from 1 to 4,

A is selected from the group consisting of straight chain alkyl groups having 1 to 5 carbon atoms, branched chain alkyl groups of from 3 to 5 carbon atoms, cyclohexyl group, phenyl group and Z groups, Z is a group selected from trimethyl siloxy, pentamethyl disiloxanyl, heptamethyl trisiloxanyl, nonamethyl tetrasiloxanyl, bis(trimethylsiloxy)methyl siloxanyl or tris(trimethylsiloxy)siloxanyl, "b" is an integer from 0 to 10, each "b", "A" and Z may be the same or different, and the total of "b" values being at least 1.

12. A contact lens material in accordance with claim 11 wherein said unsaturated polymerizable group Y and Y' is selected from the group consisting of vinyl, methacryloxy, acryloxy, methacrylamido, acrylamido, styryl and allyl and the divalent hydrocarbon of X and X' is selected from the group consisting of methylene, ethylene, propylene and butylene.

13. A contact lens material in accordance with claim 12 wherein A is selected from the group consisting of alkyl, cycloalkyl, aryl, aralkyl, alkaryl, haloaryl and halo substituted lower alkyl radicals.

14. A contact lens material in accordance with claim 11 wherein said multifunctional organosiloxane is 1,3-bis(γ-methacryloxypropyl)-1,1,3,3tetra(trimethylsiloxy)disiloxane.

15. A contact lens material in accordance with claim 11 wherein said multifunctional organosiloxane is 1,3-bis(γ-methacryloxypropyl)-1,1,3,3tetra(trimethylsiloxy)disiloxane.

16. A contact lens material in accordance with claim 11 wherein said multifunctional organosiloxane is tetra[γ-methacryloxypropyl dimethyl siloxy]silane.

17. A contact lens material in accordance with claim 11 wherein said multifunctional organosiloxane is 1,3-bis (γ-methacryloxypropyl)-1,1,3,3tetra(pentamethyl disiloxanyl)disiloxane.

18. A contact lens material in accordance with claim 11 wherein said multifunctional organosiloxane is 1,3-bis(γ-methacryloxypropyl)-1,1,3,3tetra[bis(trimethylsiloxy)methyl siloxanyl]disiloxane.

19. A contact lens material in accordance with claim 11 wherein said multifunctional organosiloxane is 1,7-bis(γ-methacryloxypropyl)-1,1,3,3,5,5,7,7-octa(trimethylsiloxy)tetrasiloxane.

20. A contact lens material in accordance with claim 11 wherein said multifunctional organosiloxane is tris(γ-methacryloxypropyl tetramethyl disiloxanyl)trimethylsiloxy silane.

21. A contact lens material in accordance with claim 11 wherein said multifunctional organosiloxane is 1,7-bis(γ-methacryloxypropyl)-1,1,7,7-tetra(pentamethyl disiloxanyl)-3,3,5,5-tetra(trimethylsiloxy)tetrasiloxane.

22. A contact lens material in accordance with claim 11 wherein said multifunctional organosiloxane is tris(γ-methacryloxypropyl tetramethyl disiloxanyl)methyl silane.

23. The contact lens material of claim 11 wherein said mixture comprises:
(1) the multifunctional organosiloxane,
(2) the monofunctional organosiloxane, and
(3) a wetting agent
wherein:
the combination of (1) and (2) comprises 99 to 80% by weight of said mixture (1) being from about 30 to about 100% by weight of said combination and (2) being from 0 to 70% by weight of said combination, and (3) comprises 1 to 20% of said mixture, said wetting agent being an ethylenically unsaturated hydrophilic monomer.

24. A contact lens material in accordance with claim 23 wherein said mixture further comprises a hardening agent, said agent being an ester of a $C_1$–$C_{20}$ monohydric or polyhydric alkanol or phenol and an acid selected from the group consisting of acrylic and methacrylic acid.

25. A contact lens material in accordance with claim 24 wherein said hardening agent comprises an itaconate mono or di ester.

26. An oxygen permeable, dimensionally stable, wettable contact lens of high trannsparency comprised substantially of a polymer formed by free radical polymerization of the following monomeric mixture comprising:
(1) multifunctional organosiloxane,
(2) monofunctional organosiloxane, (3) ester,
(4) hydrophilic monomer and
(5) itaconate wherein: the combination of (1) and (2) comprises from 3 to 65% by weight of said mixture, (1) being from about 30 to about 100% by weight of said combination and (2) being from about 0 to 70% by weight of said combination, (3) being from 1 to 45% by weight of said mixture, and (4) being from 1 to 20% by weight of said mixture and (5) being from 1 to 20% by weight of said mixture, said multifunctional organosiloxane (1) being:

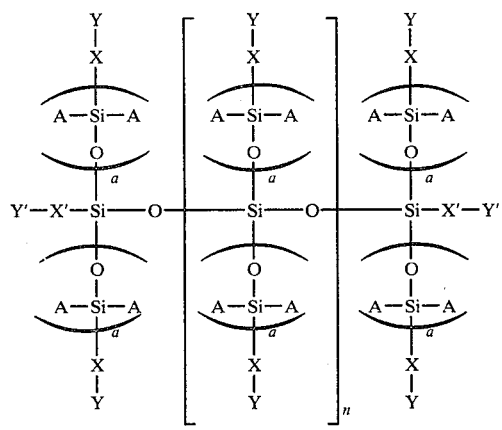

wherein:
Y' is an unsaturated polymerizable group selected from the group consisting of vinyl, methacryloxy, acryloxy, methacrylamido, acrylamido, styryl and allyl, X' is a divalent hydrocarbon having from 0 to 10 carbons, Y is an unsaturated polymerizable group selected from the group consisting of vinyl, methacryloxy, acryloxy, methacrylamido, acrylamido, styryl, allyl and hydrogen, X is a divalent hydrocarbon having from 1 to 10 carbon atoms, or phenylene, A is selected from the group consisting of straight chain alkyl groups having 1 to 5 carbon atoms, branched chain, or cyclic alkyl groups having 3 to 5 carbon atoms, phenyl group and "Z" groups, Z is a group selected from the following:
trimethyl siloxy,
pentamethyl disiloxanyl,
heptamethyl trisiloxanyl,
nonamethyl tetrasiloxanyl,
bis(trimethylsiloxy)methyl siloxanyl or
tris(trimethylsiloxy) siloxanyl "a" is an integer from 0 to 10 the total of "a" values is at least 2, "n" is an integer from 0 to about 10, and each of said X, X', Y, Y', a, A and Z groups each individually being the same or different, (2) said monofunctional organosiloxane (2) being

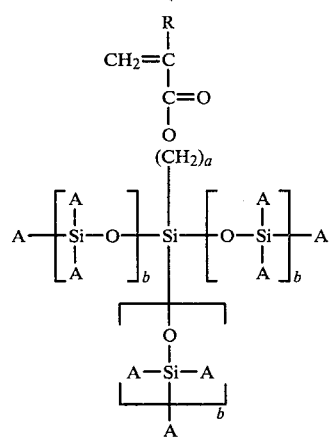

wherein:
R is selected from the class consisting of methyl groups and hydrogen,

"a" is an integer from 1 to 4,

A is selected from the group consisting of straight chain alkyl groups having from 1 to 5 carbon atoms or branched alkyl groups of from 3 to 5 carbon atoms, cyclohexyl group, phenyl group and Z groups, Z is a group selected from trimethyl siloxy, pentamethyl disiloxanyl, heptamethyl trisiloxanyl, monamethyl tetrasiloxanyl, bis(trimethylsiloxy) methyl siloxanyl or tris(trimethylsiloxy) siloxanyl, "b" is an integer from 0 to 10, each "b", "A" and Z may be the same or different, and the total of "b" values being at least 1, said ester (3) being an ester of a $C_1$-$C_{20}$ monohydric or polyhydric alkanol or phenol at an acid selected from the class consisting of acrylic and methacrylic acid, said hydrophilic monomer being an ethylenically unsaturated hydrophilic monomer to impart hydrophilic properties to the surface of the contact lens material, and said itaconate (5) being an itaconate mono or di ester.

27. An oxygen permeable, dimensionally stable, wettable contact lens of high transparency comprising substantially a polymer formed by free radical polymerization from a monomeric mixture of (1) multifunctional organosiloxane and (2) monofunctional organosiloxane polymerized in the presence of a wetting agent wherein (1) is present in an amount of above about 30% by weight of said mixture and (2) is present in an amount of up to about 70% by weight of said mixture said multifunctional organosiloxane (1) having the formula:

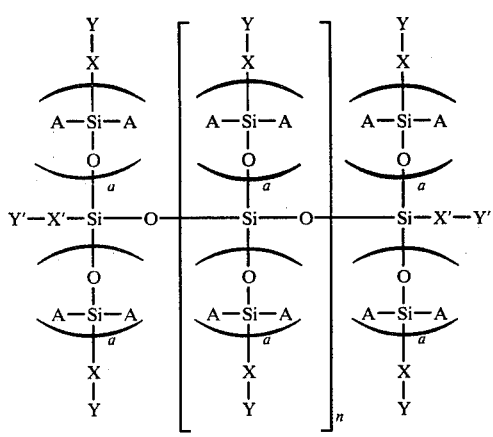

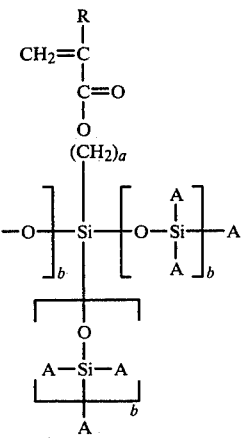

wherein:

Y' is an unsaturated polymerizable group selected from the group consisting of vinyl, methacryloxy, acryloxy, methacrylamino, acrylamido, styryl and allyl, X' is a divalent hydrocarbon having from 0 to 10 carbons, Y is an unsaturated polymerizable group selected from the group consisting of vinyl, methacryloxy, acryloxy, methacrylamido, acrylamido, styryl, allyl and hydrogen, X is a divalent hydrocarbon having from 1 to 10 carbon atoms, or phenylene, A is selected from the group consisting of straight chain alkyl groups having 1 to 5 carbon atoms, branched chain, or cyclic alkyl groups having 3 to 5 carbon atoms, phenyl group and "Z" groups, Z is a group selected from the following:
trimethyl siloxy,
pentamethyl disiloxanyl,
heptamethyl trisiloxanyl,
nonamethyl tetrasiloxanyl,
bis(trimethylsiloxy)methyl siloxanyl or
tris(trimethylsiloxy) siloxanyl "a" is an integer from 0 to 10, the total of "a" values is at least 2, "n" is an integer from 0 to about 10, and each of said X, X', Y, Y', a, A and Z groups each individually being the same or different, said monofunctional organosiloxane (2) having the formula:

wherein:

R is selected from the group consisting of methyl groups and hydrogen,

"a" is an integer from 1 to 4,

A is selected from the group consisting of straight chain alkyl groups of from 1 to 5 carbon atoms and branched chain alkyl groups of from 3 to 5 carbon atoms, cyclohexyl group, phenyl group and Z groups, Z is a group selected from trimethyl siloxy, pentamethyl disiloxanyl, heptamethyl trisiloxanyl, monamethyl tetrasiloxanyl, bis(trimethylsiloxy) methyl siloxanyl or tris(trimethylsiloxy) siloxanyl, "b" is an integer from 0 to 10, each "b", "A" and Z may be the same or different, and the total of "b" values being at least 1, and said wetting agent being ethylenically unsaturated and admixed with said monomeric mixture.

28. An oxygen permeable, hard, machinable, dimensionally stable, contact lens in accordance with claim 27 wherein said mixture further comprises a hardening or softening agent.

29. An oxygen permeable, hard, machinable, dimensionally stable, contact lens in accordance, with claim 28 wherein said agent is a hydrophilic hardening agent.

30. A contact lens in accordance with claim 26 wherein said multifunctional organosiloxane is 1,3-bis (γmethacryloxypropyl)-1,1,3,3tetra(trimethylsiloxy) disiloxane and said monofunctional organosiloxane is methacryloxypropyl tris (trimethylsilyl)siloxane.

31. A contact lens in accordance with claim 30 wherein said ester is methylmethacrylate.

32. A contact lens in accordance with claim 23 wherein said multifunctional organosiloxane is 1,3-bis (γmethacryloxypropyl)-1,1,3,3tetra(trimethylsiloxy) disiloxane and said monofunctional organosiloxane is methacryloxypropyl tris (trimethylsilyl)siloxane.

33. A contact lens in accordance with claim 32 wherein said ester is methylmethacrylate.

* * * * *